(No Model.)
B. J. WESTERVELT.
CAR WHEEL.
No. 462,872. Patented Nov. 10, 1891.
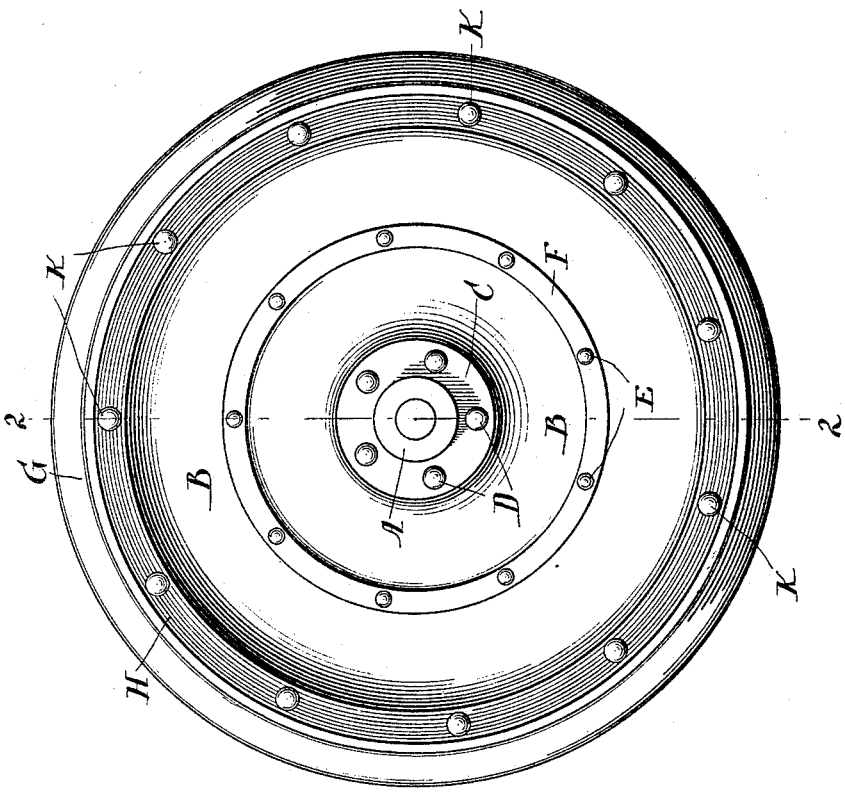
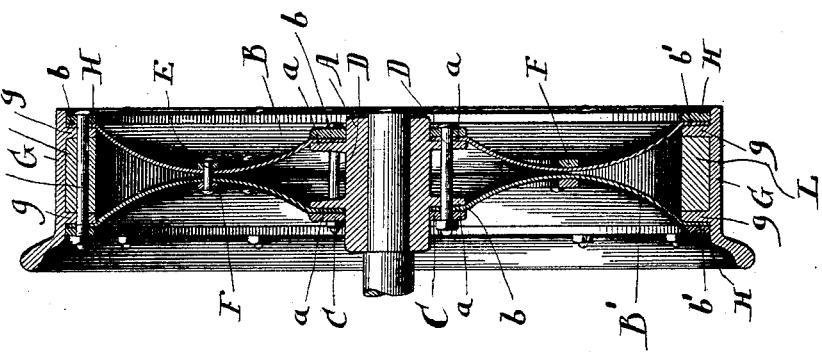

UNITED STATES PATENT OFFICE.

BENJAMIN J. WESTERVELT, OF BUDA, ILLINOIS, ASSIGNOR TO THE BUDA IRON WORKS, OF SAME PLACE.

CAR-WHEEL.

SPECIFICATION forming part of Letters Patent No. 462,872, dated November 10, 1891.

Application filed May 22, 1891. Serial No. 393,728. (No model.)

*To all whom it may concern:*

Be it known that I, BENJAMIN J. WESTERVELT, residing at Buda, in the county of Bureau, State of Illinois, have invented certain new and useful Improvements in Car-Wheels, of which the following is hereby declared to be a full, clear, and exact description, reference being had to the accompanying drawings, forming part of this specification.

My present invention has relation more particularly to that class of car-wheels the bodies whereof are composed of metal plates suitably united to metallic hubs and tires; and the object of my invention is to provide a simple, cheap, strong, and durable construction of wheel. This object I have accomplished by the novel features of construction hereinafter described, illustrated in the accompanying drawings, and particularly pointed out in the claims at the end of this specification.

Figure 1 is a view in side elevation of a car-wheel embodying my invention. Fig. 2 is a view in central transverse section through Fig. 1.

The hub A of the wheel is formed of cast metal with peripheral flanges $a$, to which will be bolted the metal plates B and B' that constitute the body of the wheel. These plates B B' have their centers perforated to encircle the hub A, and between their centers and their peripheries the plates are pressed into concavo-convex shape, as illustrated in the drawings. Adjacent their centers the plates B B' are provided with the straight or flat portions $b$, that are firmly bound to the peripheral flanges $a$ of the hub by retaining-rings C, these rings and the flanges $a$ being perforated to receive the through-bolts D. The concavo-convex plates B B' are reversely set, as shown, so that the centers of their concavo-convex portions shall come opposite each other, and at such points the plates B B' are united together by means of the through-bolts or rivets E and the clamping-rings F, these bolts passing through suitable perforations in the rings F and in the plates B B'. The outer edges of the plates B B' are formed with the flattened portions $b'$ to permit the more ready attachment of the plates to the depending flanges $g$ of the tire G, these flanges being formed in piece with the tire in the process of manufacture. Suitable retaining-rings H serve to clamp the outer edges of the plates B B' to the flanges $g$ of the tire, these retaining-rings and flanges being perforated to receive the through-bolts K, that serve to hold the parts securely together. By preference the space between the internal flanges $g$ of the tire G is filled with the blocks of wood L, perforated to receive the through-bolts K, these blocks serving to give increased strength and rigidity to the flanges $g$ of the tire and to support and stiffen the tire when it becomes worn down.

By the above-described construction I have succeeded in producing a very light wheel possessing great strength and durability. By forming the plates B B' with the concavo-convex depressions between their centers and peripheries the plates brace each other against strain in both vertical and horizontal direction, while by uniting the plates to the flanges of the hub and tire through the medium of retaining-rings and through-bolts a firm and secure union of the parts at such points is effected.

Instead of providing the tire G with two internal flanges $g$, a single flange only might be used, in which case the flattened portions $b'$ of one of the plates will be clamped directly against the face of the wooden filling L.

Having thus described my invention, what I claim as new, and desire to secure by Letters Patent, is—

1. A car-wheel consisting of a hub A, provided with flanges $a$, a body comprising metal plates B B', said plates being formed with concavo-convex depressions between their centers and peripheries and being reversely set upon the hub and being formed also with flattened portions $b$ $b'$ about their centers and peripheries to afford a direct bearing of the edges of the plates against the hub and tire, an internally-flanged tire G, to which said plates B B' are connected, and suitable retaining-rings and through-bolts for uniting said plates B B' to the hub and tire of the wheel, and suitable clamping-rings and bolts or rivets for uniting said plates at the centers of their concavo-convex portions, substantially as described.

2. A car-wheel consisting of a hub A, provided with flanges $a$, a body comprising metal plates B B′, said plates being formed with concavo-convex depressions between their centers and peripheries and being formed also with flattened portions $b\ b'$ about their centers and peripheries and being reversely set upon the hub, an internally-flanged tire G, to which said plates B B′ are connected, a wooden filling L between the outer peripheries of the plates B B′, and suitable retaining-rings and through-bolts for uniting said plates B B′ to the hub and tire of the wheel, and suitable clamping-rings and bolts or rivets for uniting said plates at the centers of their concavo-convex portions, substantially as described.

BENJAMIN J. WESTERVELT.

Witnesses:
LEWIS J. AKIN,
S. TOOMEY.